(12) United States Patent
Schmit et al.

(10) Patent No.: US 9,520,658 B1
(45) Date of Patent: Dec. 13, 2016

(54) FASTENER ASSEMBLY

(71) Applicant: Deere & Company, Moline, IL (US)

(72) Inventors: Christopher J. Schmit, Fargo, ND (US); Joe S. Sauvageau, Oxbow, ND (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/009,048

(22) Filed: Jan. 28, 2016

(51) Int. Cl.
*H01R 13/73* (2006.01)
*H01R 12/57* (2011.01)
*H01R 13/621* (2006.01)
H01R 13/74 (2006.01)
F16B 37/04 (2006.01)
H01R 4/34 (2006.01)

(52) U.S. Cl.
CPC .......... *H01R 12/57* (2013.01); *H01R 13/6215* (2013.01); *F16B 37/043* (2013.01); *H01R 4/34* (2013.01); *H01R 13/748* (2013.01)

(58) Field of Classification Search
None
See application file for complete search history.

(56) References Cited

U.S. PATENT DOCUMENTS

| | | | | |
|---|---|---|---|---|
| 3,694,013 A | * | 9/1972 | Heitner | E04D 13/0305 403/21 |
| 4,076,368 A | * | 2/1978 | Erickson | H01H 33/025 439/737 |
| 4,521,148 A | | 6/1985 | Tanaka | |
| 5,249,983 A | * | 10/1993 | Hirai | H01R 12/707 439/567 |
| 5,536,125 A | * | 7/1996 | Gaw, Jr. | F16B 5/0241 411/112 |
| 6,131,252 A | * | 10/2000 | Hoheisel | B60K 13/04 24/514 |
| 6,375,499 B1 | * | 4/2002 | Lin | F16B 43/00 411/182 |
| 6,859,370 B1 | * | 2/2005 | Hsu | H01R 12/52 361/728 |
| 2013/0342007 A1 | * | 12/2013 | Pujol | H01R 12/53 307/9.1 |

FOREIGN PATENT DOCUMENTS

| | | |
|---|---|---|
| EP | 0222301 A2 | 5/1987 |
| FR | 2983270 A | 5/2013 |
| KR | 20020044018 A | 6/2002 |

* cited by examiner

Primary Examiner — Tho D Ta

(57) ABSTRACT

A fastener assembly includes a second part for fastening to the first part. The first and second parts have openings for aligning with each other. The second part has a plurality of slots spaced apart from its opening. A nut holder is mounted to the second part. The holder has a base and a plurality of flexible legs projecting from the base. Each leg is adapted to be inserted through a corresponding one of the slots and to hold the holder to the second part. The base has a hexagonal shaped opening. The assembly also includes a hexagonal nut and a bolt. The nut is non-rotatably received by the hexagonal opening. The threaded shaft of the bolt extends through the first and second openings, and is threadably received by the nut so that the first part is held between the bolt head and the second part.

11 Claims, 5 Drawing Sheets

FASTENER ASSEMBLY

TECHNICAL FIELD

The present disclosure relates to a fastener assembly for fastening two parts together with a mechanical and electrical connection, such as fastening a contact or terminal of an electrical or electronic module to a respective conductive trace or portion of a circuit board.

BACKGROUND

The current method connecting electrical contacts to a circuit board involves creating a fixture to allow access by a machine or person to the bottom and the top of the board. The fixture then places all the components needed for the bolted joint and allows the manufacturing personnel to make the connection. This increases the cost of the assembly and increases the time required to complete the assembly. This also increases the risk that the parts may become damaged during the transfer of the parts from the fixture to the enclosure assembly. Another problem with standard electrical bolted connections is that if one chooses not to make a fixture and use the enclosure to hold the parts during the fastening process, additional room must be given to allow for manufacturing tools to be installed and removed. This compromises power density of the power module one is trying to build.

Alternatively, a nut can be soldered part to the circuit board. This is not preferred as it requires special manufacturing processes to ensure the solder joint has been made correctly. In addition, nuts have been used which have features which allow them to be pressed into metallic objects (PEM nuts, bolts, and studs). This requires the base to be made of a metal. Also, a nut holder has been used with a special custom nut which is designed to be installed into a sheet metal object, such as a small sheet metal bent part that holds a special nut.

SUMMARY

According to an aspect of the present disclosure, a fastener assembly includes a first part with a first opening therein and a second part for fastening to the first part. The second part has a second opening therein for aligning with the first opening. The second part also has a plurality of slots formed therein. A nut holder mounts to the second part. The nut holder includes a base and a plurality of flexible legs which project from the base. Each leg is adapted to be inserted through a corresponding one of the slots and to hold the nut holder to the second part. The base has a non-circular third opening therein or another third opening that engages or interlocks with a nut (e.g., a keyed nut or notched nut) to retain it and secure it against relative rotation. In one embodiment, a non-circular nut is non-rotatably received by the third opening and is prevented from passing through the holder. A bolt has a head and a threaded shaft. The shaft extends through the first and second openings, and is threadably received by the nut so that the first part is held between the head and the second part.

The nut includes a body and a flange which projects radially outwardly from one end of the body. The flange engages the holder to prevent the nut from passing through the holder. Each leg has a prong formed on the end thereof. The prong is tapered from a narrow end to a wider end. The wider end is position between the holder base and the narrow end. The prong has a shoulder surface which faces the base of the holder and which engages the second part when the prong is inserted through the slot. The body of the nut and of the third opening are preferably hexagonal shaped.

DETAILED DESCRIPTION OF THE DRAWINGS

At least one example embodiment of the subject matter of this disclosure is understood by referring to FIGS. 1 through 5 of the drawings.

Figure 1:
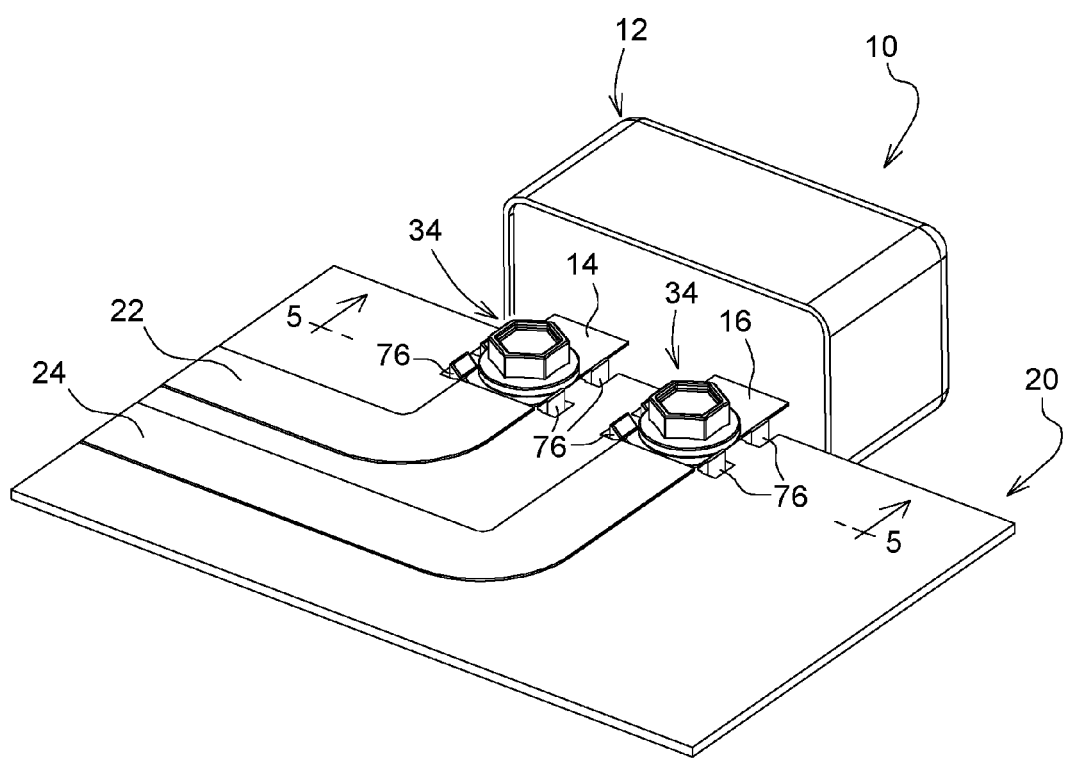
FIG. 1 is a perspective view of a fastener assembly embodying the invention.

Referring to FIG. 1, an electronic module 10 includes a housing 12 and a pair of first parts or flat electrical contacts 14 and 16 which project from a side 18 of the housing 12. The contacts are fastened to a second part, such as a circuit board, a substrate, or printed circuit board (PCB) board 20. As illustrated, the circuit board 20 has conductive strips 22 and 24 which engage the contacts 14 and 16, respectively, and which overlie a dielectric substrate.

Figure 2:
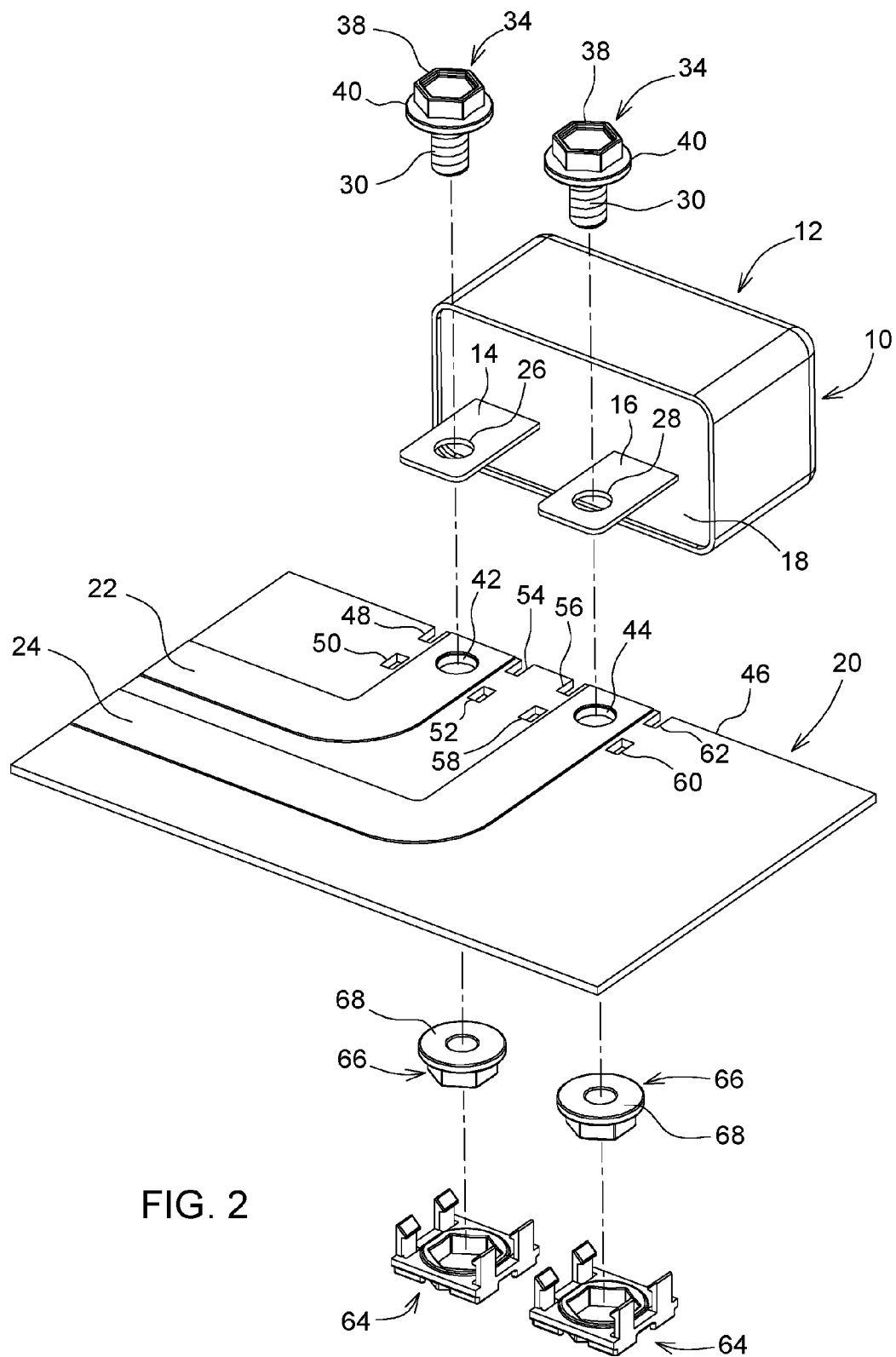
FIG. 2 is an exploded assembly view of the invention of FIG. 1.

As best seen in FIG. 2, the contacts 14 and 16 have respective openings or bores 26 and 28 which extend therethrough. The openings 26 and 28 are adapted to receive the threaded shafts 30, respectively, of fasteners 34 which are preferably bolts. Each bolt includes a hexagonal head 38 and a flange or washer 40.

The circuit board 20 has openings or bores 42 and 44 which are spaced apart from each other and from an edge 46 of the board 20. Slots 48, 50, 52 and 54 are formed around opening 42. Slots 56, 58, 60 and 62 are formed around opening 44. The openings and slots extend through the board 20.

A pair of nut holders 64 hold hex nuts 66 or other suitable retainers or threaded retainers. Each nut 66 has a flange 68. The nut holders 64 are adapted to be attached to the board 20 and may be formed as plastic clips.

Figure 3:
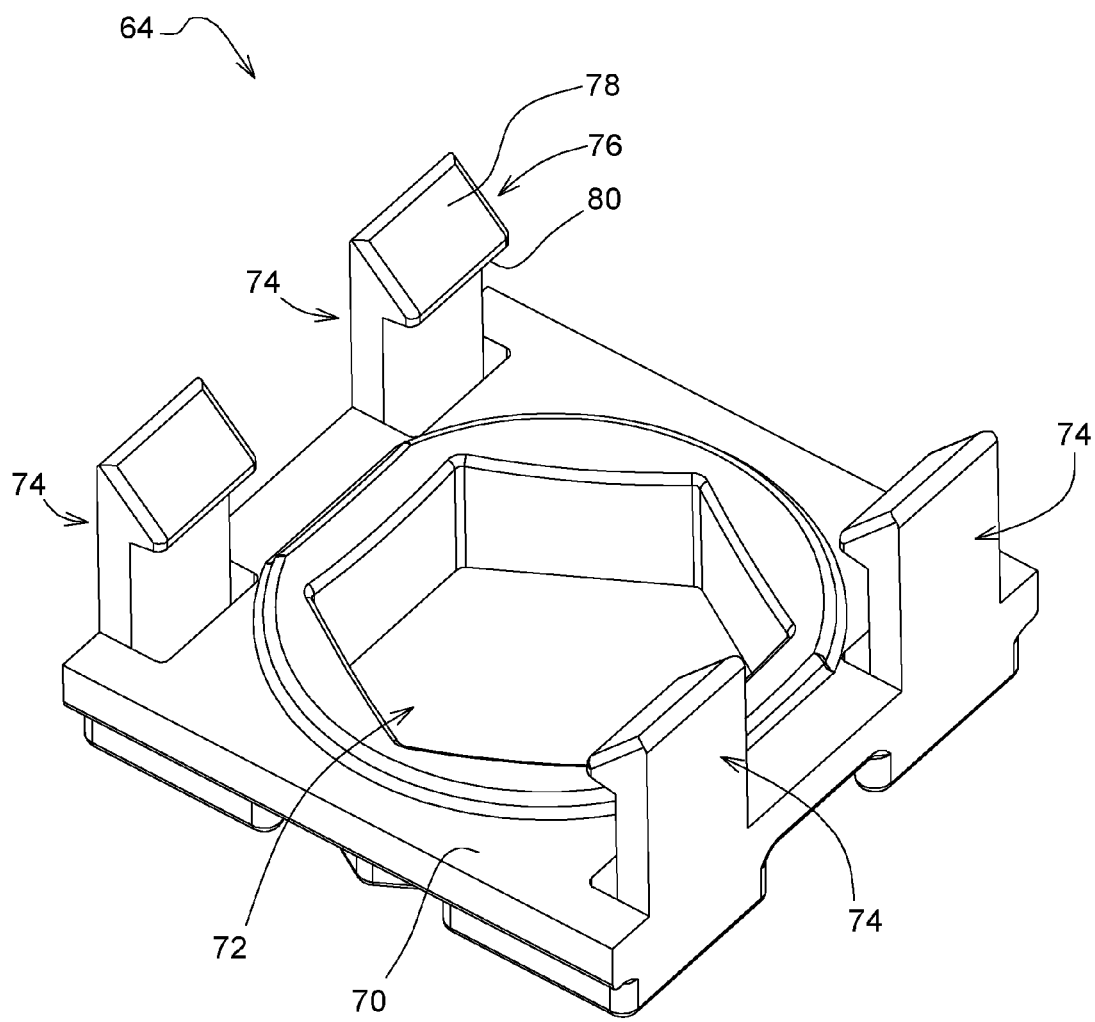
FIG. 3 is an enlarged top perspective view of the holder part of FIG. 1.
Figure 4:
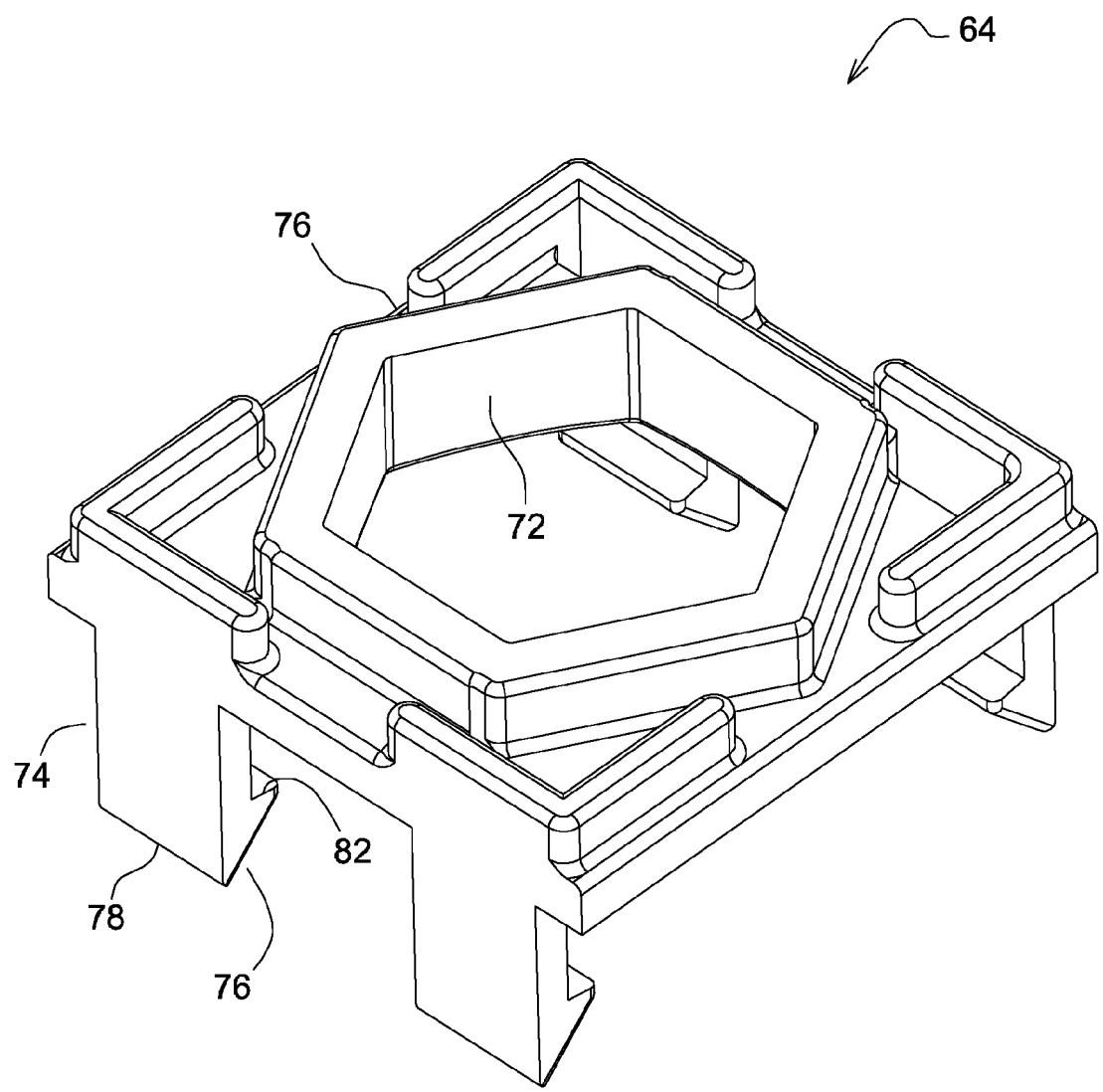
FIG. 4 is an enlarged bottom perspective view of the holder part of FIG. 1.
Figure 5:
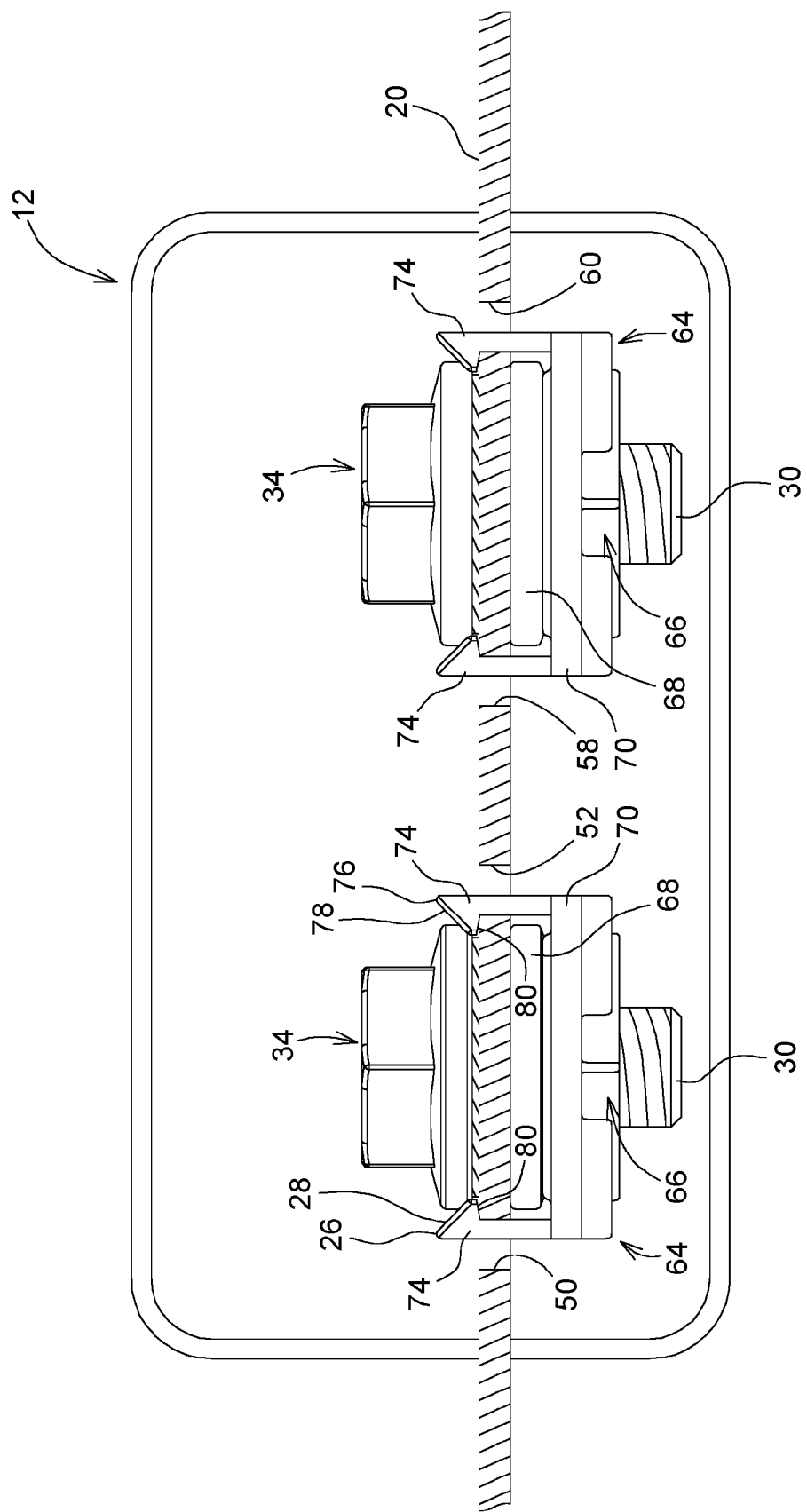
FIG. 5 is a sectional view along lines 5-5 of FIG. 1.

Referring now to FIGS. 3-5, each nut holder 64 includes a base 70. As illustrated, a non-circular central opening 72 extends through the base 70. For example, the opening 72 is substantially polygonal shaped and may be substantially hexagonal shaped. However, in an alternate embodiment (not shown), the central opening 72 has any suitable shape (e.g. substantially circular or elliptical with a notch or protrusion) and size to engage or interlock with a nut (e.g., a keyed nut or notched nut to replace hex nut 66) to retain it and secure it against relative rotation.

In one embodiment, the portion 74 of the base 70 which surrounds the opening 72 engages the flange 68 of the hex nut 66 and prevents the nut 66 from passing through the holder 64. Alternatively, if an un-flanged nut is used then the opening 72 could be tapered to prevent such a nut (not shown) from passing through the holder 64. Each nut holder 64 also includes a plurality of flexible legs 74 which project from the corners of the base 70. Each leg 74 extends generally parallel to a central axis of the opening 72.

Each leg 74 has a prong 76 formed on the end thereof. The prong 76 is tapered from an outer narrow end 78 to an inner wider end 80. The wider end 80 is position between the holder base 70 and the narrow end 78. Each prong 76 has a shoulder surface 82 which faces the base 70 of the holder 64, and which is engagable with the upper surface of the second part 20 when the prong 76 is inserted through one of the slots 48-62. The prongs 76 can be compressible with respect to the slots 48-62 and configured as a snap-fit connector such that the prong 76 compresses to fit into the corresponding one of slots 48-62.

In operation, the flanged hex nut 66 is placed in the hex-shaped opening 72 in the base 70 of the nut holder 64 with the flange 68 oriented upwardly, as best seen in FIG. 2. The nut holder 64 with nut 66 is then assembled to the circuit board 20 so that the prongs 76 are inserted through or clip into the corresponding slots 48-62 and so that the shoulder surfaces 82 engage the upper surface of the board 20. At this point, the nut 66 will be held in alignment with the openings 26, 28 and 42, 44, without further attention or action by the assembler. The bolts 38, 36 can then be inserted through the corresponding openings and threaded into the corresponding nut 68 to thereby secure the contacts 14 and 16 to the board 20.

After the nut holder 64 and nut 6 are clipped into the circuit board 20, the board 20 may then be freely moved about and install into an enclosure (not shown). This allows additional connecting components, such as the bolt 34, 36 to be installed over the top of the circuit board 20 without having to access or manipulate the nut.

Thus, the nut holder 64 retains the flange nut 66 (or other type of fastener) to the bottom side of the board 20, such as a high power circuit board. After the flange nut 66 is installed into the nut holder 64 and the nut holder 64 is attached to the power circuit board 20, the power circuit board can then be installed into an enclosure (not shown).

As an alternative, the nut holder could be modified to hold multiple nuts. Also, the nut holder could insulate the nut and the part of the bolt protruding from the bottom of the flange nut from an enclosure as well as from other parts. This would allow features of an enclosure to be positioned closer to the connection contacts. Such connections may be powered with an electrical signal of up to approximately 700 volts, which requires clearances and insulation. If the nut holder is an insulating component that is composed of a dielectric material, such as ceramic, plastic, polymer or a fiber-filled plastic or polymer, then any enclosure could become smaller, increasing power density. The nut holder could also be designed to accommodate additional parts, such as a flange nut and with a Bellville washer. The nut holder could be designed to work with different fasteners, such as a bolt for applications that need a stud to protrude through the circuit board. Also, the slots could be formed in both parts so that the holder legs would extend through both parts.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A fastener assembly:
a first part, the first part having a first opening therein;
a second part for fastening to the first part, the second part having a second opening therein for aligning with the first opening, and the second part having a slot formed therein;
a holder for mounting to the second part, the holder comprising a base and at least one flexible leg projecting from the base for insertion through the slot and holding the holder to the second part, the base having a third opening therein, the third opening having a polygonal shape;
a nut having a polygonal shape, the nut being adapted to be non-rotatably received by the third opening; and
a bolt having a head and a threaded shaft, the shaft extending through the first and second openings, and the shaft being threadably received by the nut so that the first part is held between the head and the second part.

2. The fastener assembly of claim 1, wherein:
the nut comprises a polygonal shaped body and a flange projecting radially outwardly from one end of the body, the flange being engagable with the holder to prevent the nut from passing through the holder.

3. The fastener assembly of claim 1, wherein:
the leg has a prong formed on the end thereof, the prong being tapered from a narrow end to a wider end, the wider end being position between the holder base and the narrow end, the prong having a shoulder surface which faces the base of the holder and which is engagable with the second part when the prong is inserted through the slot.

4. The fastener assembly of claim 1, wherein:
the body of the nut is hexagonal shaped, and the third opening is hexagonal shaped.

5. The fastener assembly of claim 1, wherein:
the first part is an electrical contact and the second part is a PCB board.

6. The fastener assembly of claim 1, wherein:
the slot is spaced apart from and adjacent to the second opening.

7. A fastener assembly:
a first part, the first part having a first opening therein;
a second part for fastening to the first part, the second part having a second opening therein for aligning with the first opening, and the second part having a plurality of slots therein;
a holder for mounting to the second part, the holder comprising a base and a plurality of flexible legs projecting from the base, each leg being adapted to be inserted through a corresponding one of the slots and to hold the holder to the second part, the base having a third opening therein, the third opening having a hexagonal shape;
a nut having a hexagonal shape, the nut being adapted to be non-rotatably received by the third opening; and
a bolt having a head and a threaded shaft, the shaft extending through the first and second openings, and the shaft being threadably received by the nut so that the first part is held between the head and the second part.

8. The fastener assembly of claim 7, wherein:
the nut includes a body and a flange projecting radially outwardly from one end of the body, the flange being engagable with the holder to prevent the nut from passing through the holder.

9. The fastener assembly of claim 7, wherein:
each leg has a prong formed on the end thereof, the prong being tapered from a narrow end to a wider end, the wider end being position between the holder base and the narrow end, the prong having a shoulder surface which faces the base of the holder and which is engagable with the second part when the prong is inserted through the slot.

10. The fastener assembly of claim 7, wherein:
the body of the nut is hexagonal shaped, and the third opening is hexagonal shaped.

11. A fastener assembly:
a first part, the first part having a first opening therein;
a second part for fastening to the first part, the second part having a second opening therein for aligning with the first opening;
a plurality of slots formed in at least one of the first and second parts;
a holder for mounting to one of the first and second parts, the holder comprising a base and a plurality of flexible legs projecting from the base, each leg being adapted to be inserted through a corresponding one of the slots and to hold the holder to the part having the slots, the base having a third opening therein, the third opening having a non-circular shape;
a nut having a non-circular shape, the nut being adapted to be non-rotatably received by the third opening; and
a bolt having a head and a threaded shaft, the shaft extending through the first and second openings, and the shaft being threadably received by the nut so that the first part is held between the head and the second part.

\* \* \* \* \*